Feb. 5, 1946.    C. N. BARLOW    2,394,137
VERNIER HEIGHT GAUGE
Filed July 8, 1944    2 Sheets-Sheet 1

INVENTOR
Carl N. Barlow

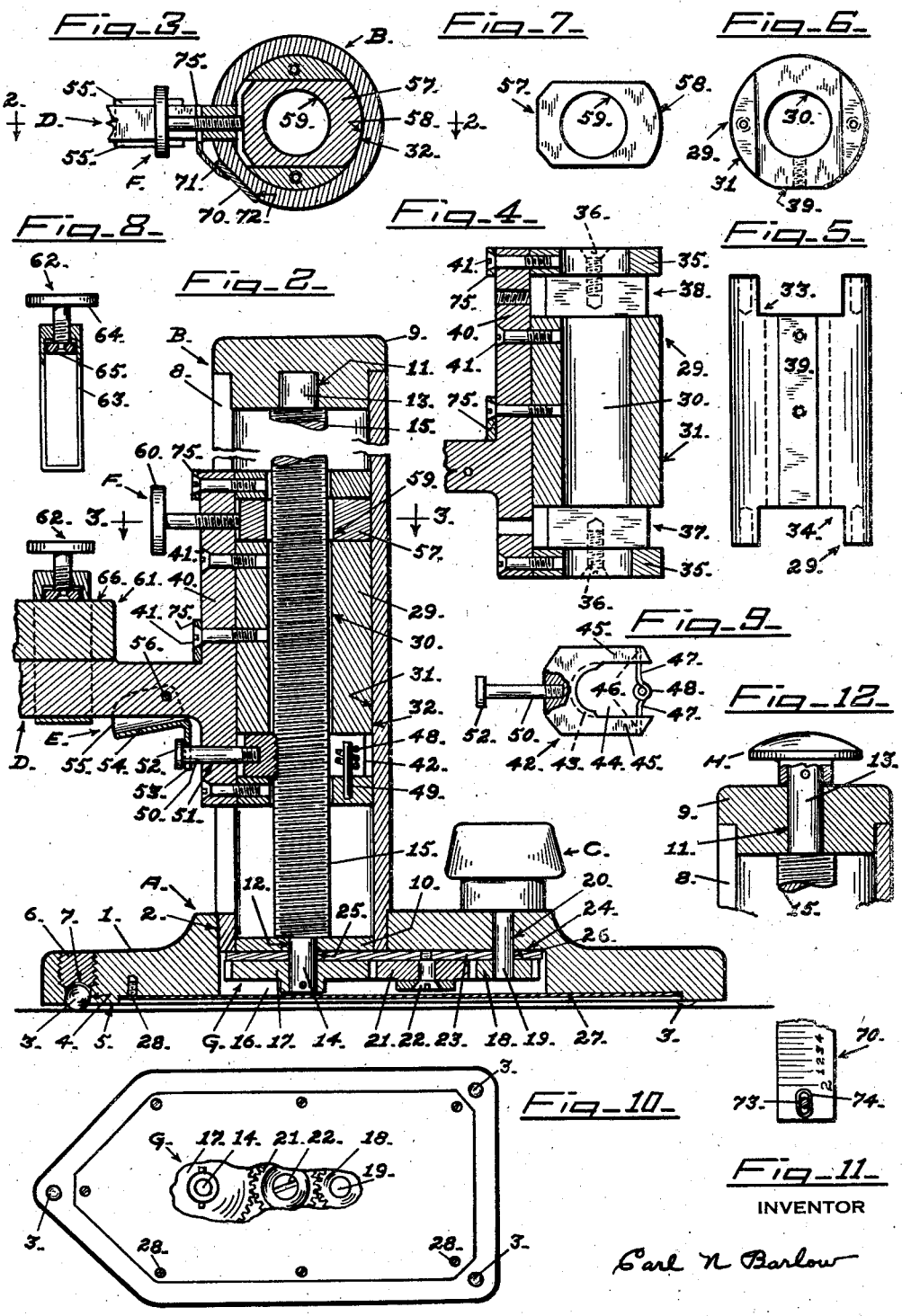

Patented Feb. 5, 1946

2,394,137

UNITED STATES PATENT OFFICE 2,394,137

VERNIER HEIGHT GAUGE

Carl N. Barlow, Los Angeles, Calif.

Application July 8, 1944, Serial No. 543,979

12 Claims. (Cl. 33—170)

This invention relates to gauges adapted to provide precision measurement gauging and delineation of linear dimensions; as distances related to a planar surface supportive of the base of the instrument.

An object of my invention is to provide a gauge of the character described wherein the co-active precision finished surfaces and moving parts are enclosed in such manner as to insure protection from damage during handling and use of the instrument.

Another object is to provide a gauge structure wherein the co-active "working" surfaces affording precise functioning and adjustments of the instrument for attaining, maintaining and transferring precisional measurement accuracy are obtained by the novel disposition of unusually substantial parts providing such surfaces by the use of a tubular post and related parts.

A further object is to provide a gauge of the character described wherein manual contact with the instrument relative to the precision movement adjustment of the horizontal instrument arm takes place at a point removed therefrom and as located on the base of the instrument, whereby to insure precisional movement of the arm unhampered by direct or contiguous manipulation contact.

A further object is to provide an arrangement of vernier and linear measure scales whereon the indices of both scales face the operator for direct visual readings without recourse to turning the instrument around as in usual practice, and further provide a vernier scale having a large number of parts, for example the one having fifty as illustrated; whereon the indices divisions are spaced twice as far apart as those utilized in present practice.

With the above and other objects in view the invention consists in the novel construction and combination of parts hereinafter described, illustrated in the accompanying drawings, and set forth in the claims hereto appended, it being understood that various changes in form, proportion, size and minor details of construction within the scope of the claims may be resorted to without departing from the spirit or sacrificing any of the advantages of the invention.

In the drawings:

Figure 2 is a vertical sectional view of Figure 1 as taken on the plane of line 2—2 of Figure 3.

Figure 3 is a cross sectional view on line 3—3 of Figure 2.

Figure 4 is a longitudinal sectional view of the slide or sleeve assembly.

Figure 5 is an elevational view of the main unit portion of the slide or sleeve.

Figure 6 is an end view of Figure 5.

Figure 7 is a "plan" view of the lock member of the slide.

Figure 8 is a part sectional elevational view of the instrument arm clamp for securing devices to the arm.

Figure 9 is a part-sectional "plan" view of the half-nut member of the slide.

Figure 10 is a plan view of the "bottom" of the base partially broken away for interior disclosure.

Figure 11 is a fragmentary part-sectional elevational view of the linear measurement scale showing the linear adjustment relation of the scale to its fixture means.

Figure 12 is a fragmentary sectional view of a modified form of means providing for manual manipulation and longitudinal measurement adjustment "setting" of the slide as related to the lead screw.

Figure 1:
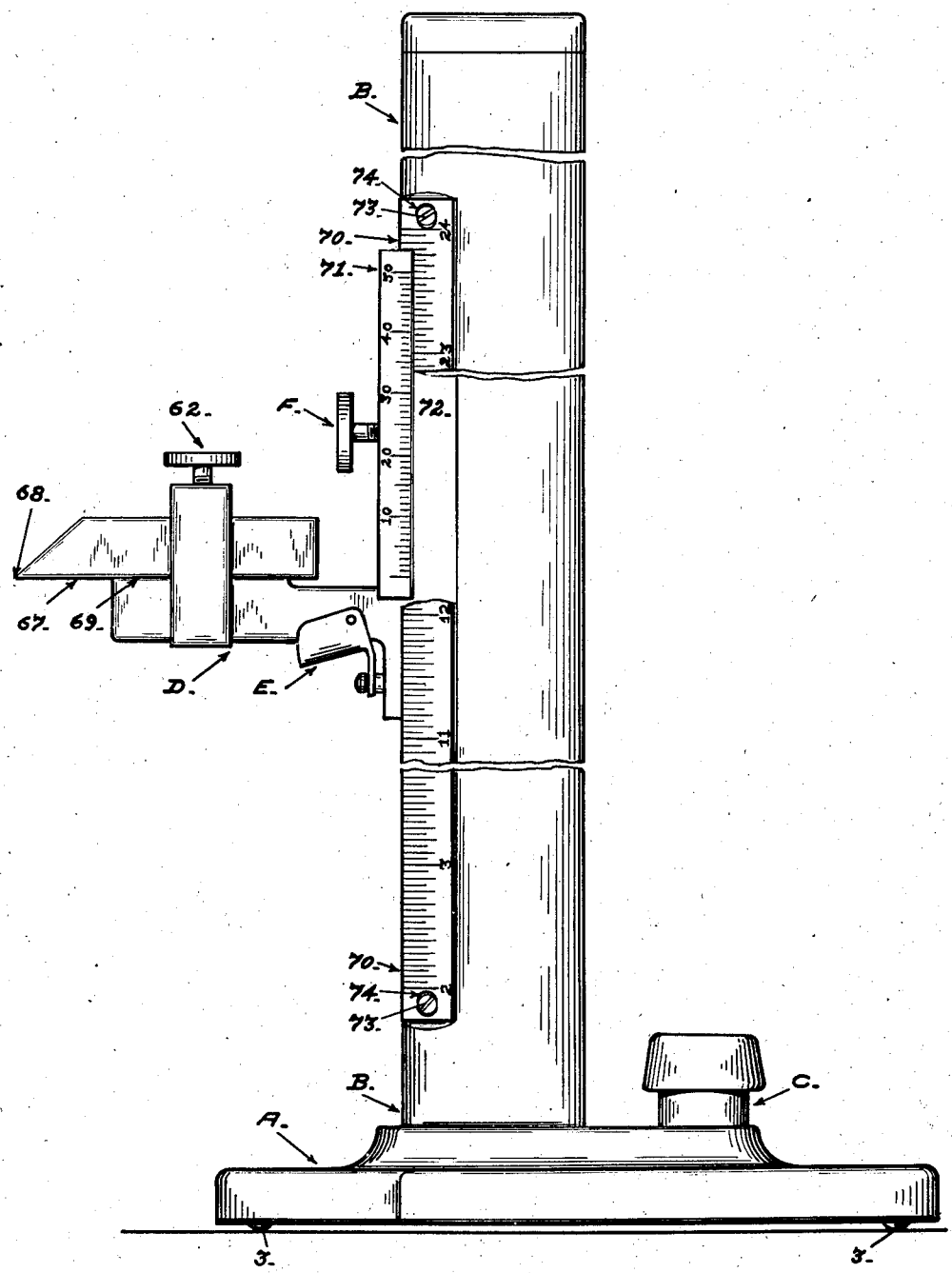
Figure 1 is a side elevational view having portions of the vertical extent thereof omitted for clarity in size of illustration.

Referring to the drawings in general; the vernier height gauge of my invention collectively embodies a base member A providing a plurality of point contacts supportive of the instrument on a planar surface. A tubular longitudinally slotted post B vertically and rigidly affixed to the base for and as providing a novel dual purpose means of attaining precisional as well as protected operation of the working parts. The bore of the tubular post provides a surrounding and thereby large surface contact for precision fitting, guidance and locking of the parts therein in contradistinction to the use of a solid member post with parts mounted, guided and locked exteriorly thereon, and in addition the tubular post of my invention provides a housing protective of the working parts against accidental damage.

In furtherance of the novelty of design above set forth; the parts, later described and functioning and housed within the tubular post, are controlled and manually operated by means disposed exteriorly thereof and comprise the knob C rotative for precision movement of the instrument arm or support D; the latch E for release, rapid traverse movement and reengagement of the rider arm D for operation by the knob C for precision adjustments, and the lock means F for insuring the desired fixed position of the arm.

Referring to the drawings more specifically; the base A consists of a substantially rectangular body portion 1 provided with the bore 2 adapted to receive and rigidly affix the tubular post B.

To insure symmetrical and precisional right-angularity of the longitudinal axis of the post B to a planar surface supportive of the instrument; a plurality of supporting "points" in the form of hardened and ground steel balls 3 are set in the spherical bottomed bores 4 in the base A in a manner providing a limited projection of the surface of the balls beyond the main surface 5 of the base. For retention of the balls in the bores 4 and adjustment of their "points" of contact for the purpose above described; I provide the threaded plug 6 threaded in a portion of the bore 4 and having the concave spherical surface 7 contacting with and forming a "backstop" for the ball whereby rotational setting and resulting thread "travel" of the respective plugs 6 serve to extrude or retract the "point" contact of any or all the balls to form a "true" plane of support for the instrument. By these means the symmetrical rightangularity of the longitudinal axis of the post B to a plane of support for the instrument is rendered precisionally adjustable.

The post B, secured to base A as described, is provided with the longitudinal slot 8 and the end closures 9 and 10 the former serving as a cap for the tubular post and provide the journal bearing bore 11, the latter affording the journal bearing 12. These bearings serve to centralize and mount the respective journal formed ends 13 and 14 of the lead screw 15 as rotative on the longitudinal center-line axis of the tube or post.

As shown; rotation of the lead screw 15 is effected by the gear train means G disposed in the recess 16 of the base A. The driven gear 17 being affixed to the journal end 14 of the lead screw 15 and the driver gear 18 to the stem 19 journaled in the bore 20 for rotation by the knob C. To afford accessible manipulation of the knob C as properly spaced from the post B the idler gear 21 is disposed between the gears 17 and 18 and mounted for rotation on the journal pin 22 affixed to the plate 23 interposed between the respective gears and the surface 24 of the recess 16. To insure aligned position and maintained meshing of the gears the plate 23 is provided with the bores 25 and 26 respectively engaging the journal end 14 of the lead screw 15 and the stem 19 of the knob C. To guard against damage of and insure dust proof operation of the gears the recess 16 is closed by the removable plate 27 secured to the base as by means of the screws 28.

As above set forth in general; the means providing for precisional guidance, setting, locking and rapid traverse movement of the instrument arm D are housed within the tubular post B whereas the means effecting manual control of these aforesaid means are disposed exteriorly of the said post.

Precisional guidance of the several parts within the post B is effected by means of the sleeve or slide 29 the central bore 30 thereof freely surrounding the lead screw 15 whereas the outer cylindrical surface 31 of the sleeve is fitted to longitudinally slide within the bore 32 of the post. The ends of the sleeve or slide 29 are provided with the transversely positioned slots 33 and 34. Plates 35, fitting the bore of the post, are secured to the ends of the sleeve, as by means of the screws 36, and thereby provide closed guideways 37 and 38 wherein enclosed parts are movable at right angles to the longitudinal center-line axis of the post B and lead screw 15. A portion of the outer cylindrical surface 31 of the sleeve 29 is cut-away to form the flat surface 39 aligned with corresponding "flats" on the plates 35 to form a seat for mounting the instrument arm D the portion 40 of which extends lengthwise of, fitted in and longtiudinally slidable in the slot 8 and is made a part of the sleeve 29 as by means of the screw fastenings 41. It is apparent that the engagement of the portion 40 of the arm D with the slot 8 prevents rotational, and provides for longitudinal movement only of the parts as a unit and as related to a cylindrical post.

Manual operation of the device relative to longitudinally positioned "setting" of the instrument arm D; in the form of rapid traverse movement thereof is controlled by manipulation of the latch means E. Precisionally guided by and slidable in the guideway 37 the spring urged half-nut 42 embodies the thread-form portion 43 adapted to engage and semicircularly surround the lead screw 15. The cut away portion 44 providing for the half-nut thread portion 43, formed in the usual manner well known in the art, leaves the prongs 45 which are provided with the holes 46 adapted to receive the opposite ends 47 of the spring 48. The coils of this spring incircle the pin 49 fixed in the respective end plate 35, in such position and manner as to urge and hold the thread portion 43 of the half-nut 42 in positive engagement with the threads of the lead screw 15. The half-nut 42 is less in length than the transverse dimension of the bore 32 of the post B to provide for lateral movement of the half-nut in the guideway 37 an amount sufficient to free the thread engagement of the half-nut from the lead screw 15. This lateral movement of the half-nut is affected exteriorly of the post by the latch means E and consists of the pin 50 secured to the half-nut and sliding in the bore 51, the head 52 thereof adapted to engage the bifurcated end 53 of the latch lever 54 having respective side portions 55 straddling the instrument arm D, and secured thereon by the fulcrum pin 56. Manipulation of the latch lever 54 such as to swing it upward and as held against the rider arm D retracts the nut from engagement with the threads of the lead screw 15. With the latch lever 54 in this release position it is apparent that the instrument arm is freely slidable and rapidly movable longitudinally of the post and when and as so manipulated constitutes the means providing for rapid traverse movement of the arm. This movement provides for quickly approximate setting of the arm at any desired height, whereupon; manual release of the latch lever 54 permits the spring 48 to impel the half-nut 42 into reengagement with the lead screw 15 whereby completion of and precisional setting of the arm is accomplished by rotational movement of the lead screw 15, as by means of the knob C.

The lock means F consists of the bolt 57 fitting and sliding in the guideway 38 of the arm slide 29 and as movable transversely in and of the bore 32 of the post B, and as having the curviform surface 58 adapted to frictionally engage or be retracted from engagement with the inner surface 32 of the tubular post. The bore 59 freely surrounds the lead screw 15 in all transverse positions of the bolt 57 for movement of the one without interference with the other. It is apparent that movement of the surface 58 of the bolt into direct forced contact with the bore surface 32 of the post, as by means of the thumb screw 60, frictionally locks the slide 29 and instrument arm D in fixed position on the post B.

Desirable forms of devices, such as the scriber 41, are secured to the instrument arm D by suitable clamping means 62 in the form of the frame 63 encircling the arm and device with clamping effort provided by the thumbscrew 64 having the shoe-slide 65 engaging the one surface 66 of the rider. By this means the rider surface 67 and scriber "point" 68 thereof, Figure 1, are aligned upon and held in fixed relation in the plane of the surface 69 as the datum "point" of the instrument arm D relative to the above described supporting "points" of the base B of the instrument; for the allocation, and transference or delineation of adjusted distances therebetween as by means of the scriber or other form of rider instrument.

Allocation of measured distances between the "points" of support and the datum "point," above described, and definable as distances related to a desired scale of measurement values are provided for by means of the scale member 70 and the vernier scale 71 graduated to any desired scale of readings. These scales are disposed in juxta-linear relation for interpolation of the scale readings of the one as longitudinally related to the other. The scale member 70, Figures 1 and 3, is mounted on the flat surface 72 extending longitudinally of the post B. The scale member 70 is longitudinally adjustably secured to the post B, as by means of the screws 73 engaging the slots 74 longitudinally disposed in the scale member 70. Such adjustment as described provides for longitudinal fixation setting of the first indexed unit of measurement on the scale member 70 with relation to the "datum point" station or surface 69 of the instrument arm D as indicated by the zero index of the vernier scale; as aligned and precisionally registering a known number of whole units of measurement as existing between the plane of support of the instrument and the "datum point" station or surface 69 of the instrument arm.

The vernier scale 71 having the ears 75, Figures 2 and 3, is secured to the instrument arm D as by means of certain of the screws 41 passing through the ears 75 and instrument arm as connectively secured to the slide 29 and as aligning the zero indicia of the vernier scale with the "datum point" or surface 69 of the instrument arm D.

In the modified form shown in Figure 12 the knob H is affixed to the journaled end 13 of the lead screw 15 as projecting through the bore 11 of the cap 9 for direct connected rotation of the lead screw 15.

Having thus described my invention I claim:

1. In a vernier height gauge; a base, an upright round tubular post affixed to said base, a lead screw longitudinally disposed within and having its ends journaled in end closures of said post, a sleeve longitudinally slidable in the bore of said post, thread means carried by said sleeve adapted to engage said lead screw whereby rotation of said screw moves said sleeve longitudinally of said post, an instrument arm on said sleeve slidable in and projecting from a longitudinal slot in said post, a linear measure scale on said post, a vernier scale on said arm, said scales disposed in juxta-linear relation for interpolation of the scale readings of the one as longitudinally related to the other and as defining distances between the supporting plane of said base and a point on said arm and means for rotating said screw.

2. In a vernier height gauge; a base, an upright tubular post affixed to said base, a lead screw longitudinally disposed within and having its ends journaled in end closures of said post, a sleeve longitudinally slidable in the bore of said post, thread means carried by said sleeve adapted to engage said lead screw whereby rotation of said screw moves said sleeve longitudinally of said post, an instrument arm on said sleeve slidable in and projecting from a longitudinal slot in said post, a linear measure scale on said post, a vernier scale on said arm, said scales disposed in juxta-linear relation for interpolation of the scale readings of the one as longitudinally related to the other and as defining distances between the supporting plane of said base and a point on said arm and gear train means in said base connected to and rotative of said screw, and means for rotating said gears.

3. In a vernier height gauge; a base, an upright tubular post affixed to said base, a lead screw longitudinally disposed within and having its ends journaled in end closures of said post, a sleeve longitudinally slidable in the bore of said post, thread means carried by said sleeve adapted to engage said lead screw whereby rotation of said screw moves said sleeve longitudinally of said post, an instrument arm on said sleeve slidable in and projecting from a longitudinal slot in said post, a linear measure scale on said post, a vernier scale on said arm, said scales disposed in juxta-linear relation for interpolation of the scale readings of the one as longitudinally related to the other and as defining distances between the supporting plane of said base and a point on said arm, a gear train housed in said base interconnecting the base enclosed end of said screw and a knob exterior of said base whereby to manually rotate the gears of said train and said screw.

4. In a vernier height gauge; a base, a cylindrical tubular longitudinally slotted post affixed to said base, a sleeve and an instrument arm thereof longitudinally slidable in said post, a lead screw freely extending through said sleeve and journaled in end closures of said post, screw-thread means on said sleeve adapted to engage and disengage said lead screw, a linear measure scale on said post, a vernier scale on said arm, said scales disposed in juxta-linear relation for interpolation of the scale readings of the one as related to the other as defining distances between the supporting plane of said base and a point on said arm and means for rotating said screw whereby to longitudinally move and set said arm when said screw-thread means engage said lead screw, and latch means on said arm for disengaging said screw-thread means from said lead screw for rapid traverse movement of said arm.

5. In a vernier height gauge; a base, a round tubular longitudinally slotted post affixed to said base, a sleeve and an instrument arm thereof longitudinally slidable in said post, a lead screw freely extending through said sleeve and journaled in end closures of said post, screw-thread means on said sleeve adapted to engage said lead screw whereby to longitudinally move and set said arm upon rotation of said screw, a linear measure scale on said post, a vernier scale on said arm, said scales disposed in juxta-linear relation for interpolation of the scale readings of the one as longitudinally related to the other as defining distances between the supporting plane of said base and a point on said arm and means for rotating said screw.

6. In a vernier height gauge, a base, a round tubular longitudinally slotted post affixed on said base and housing a lead screw, an instrument arm slide in said post, a half-nut carried by said slide, latch means carried by said arm and operable to engage and disengage said nut relative to said lead screw and means for rotating said screw.

7. In a vernier height gauge; a base, a round tubular longitudinally slotted post affixed on said base and housing a lead screw, a rider-arm slide in said post, a half-nut carried by said slide, a linear measure scale on said post, a vernier scale on said slide, levered latch means carried by said arm and operable to engage and disengage said nut relative to said lead screw and means for rotating said screw.

8. In a vernier height gauge; a base, a round tubular longitudinally slotted post affixed on said base and housing a lead screw, a rider-arm slide in said post, a half-nut carried by said slide, a linear measure scale longitudinally adjustable on said post, a vernier scale on said slide, levered latch means carried by said arm and operable to engage and disengage said nut relative to said lead screw and means for rotating said screw.

9. In a vernier height gauge; a base supported, longitudinally slotted tubular post provided with a linear measure scale, a sleeve slidable in said post and having an instrument arm projected through said slot and carrying a vernier scale in longitudinal juxtaposed relation to said linear measure scale, a lead screw journaled in said post, a thread means carried by said sleeve and movable therein to in the one instance engage said screw and move said sleeve longitudinally in said post by rotation of said screw and in the other instance disengage said sleeve from said screw and means for rotating said screw, and other means carried by said sleeve and operable to move said thread means in said sleeve.

10. In a vernier height gauge; a base supported, longitudinally slotted round tubular post provided with a linear measure scale, a sleeve slidable in said post and having an instrument arm projected through said slot and carrying a vernier scale in longitudinal juxtaposed relation to said linear measure scale, a lead screw journaled in said post, a thread means carried by said sleeve and movable therein to in the one instance engage said screw and move said sleeve longitudinally in said post by rotation of said screw and in the other instance disengage said sleeve from said screw and means for rotating said screw.

11. In a vernier height gauge; a base, a round tubular longitudinally slotted post affixed to said base, a lead screw journaled in end closures of said post, a sleeve slidable in said post, an instrument arm on said sleeve, a thread means carried by said sleeve and movable therein to in the one instance engage said screw and move said sleeve longitudinally in said post by rotation of said screw and in the other instance disengage said sleeve from said screw and means for rotating said screw.

12. In a vernier height gauge; a base, a cylindrical tubular post affixed to said base, a lead screw journaled in end closures of said post, a sleeve slidable in said post, an instrument arm on said sleeve, a spring urged thread means carried by said sleeve and movable therein to in the one instance engage said screw and move said sleeve longitudinally in said post by rotation of said screw and in the other instance disengage said sleeve from said screw and means for rotating said screw.

CARL N. BARLOW.